United States Patent
Sohn et al.

(10) Patent No.: US 8,288,484 B2
(45) Date of Patent: Oct. 16, 2012

(54) CROSS-LINKED PRODUCT OF METAL-CONTAINING POLYAMIC ACID, CROSS-LINKED PRODUCT OF METAL-CONTAINING POLYIMIDE INCLUDING THE CROSS-LINKED PRODUCT OF METAL-CONTAINING POLYAMIC ACID, METHOD OF MANUFACTURING THE CROSS-LINKED PRODUCT OF METAL-CONTAINING POLYIMIDE, AND POLYIMIDE FILM INCLUDING THE CROSS-LINKED PRODUCT OF METAL-CONTAINING POLYIMIDE

(75) Inventors: Byung-hee Sohn, Yongin-si (KR); Sang-mo Kim, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 209 days.

(21) Appl. No.: 12/721,147

(22) Filed: Mar. 10, 2010

(65) Prior Publication Data
US 2010/0273954 A1    Oct. 28, 2010

(30) Foreign Application Priority Data

Mar. 10, 2009  (KR) .................. 10-2009-0020360
Jan. 15, 2010   (KR) .................. 10-2010-0003948

(51) Int. Cl.
C08G 73/10   (2006.01)
C08L 79/08   (2006.01)

(52) U.S. Cl. ........ 525/421; 524/538; 525/436; 528/351; 528/353

(58) Field of Classification Search .................. 525/421, 525/436; 528/351, 353; 524/538
See application file for complete search history.

(56) References Cited

U.S. PATENT DOCUMENTS

| | | | |
|---|---|---|---|
| 2002/0010311 A1* | 1/2002 | Edman et al. ................ | 528/310 |
| 2007/0219342 A1 | 9/2007 | Murray et al. | |
| 2008/0237822 A1 | 10/2008 | Raravikar et al. | |

FOREIGN PATENT DOCUMENTS

| | | |
|---|---|---|
| JP | 04-214727   * | 8/1992 |
| JP | 04-255824 | 9/1992 |
| JP | 06-041507 | 2/1994 |
| JP | 2007-197590 A | 8/2007 |
| JP | 2008-063396 | 3/2008 |
| KR | 1020010031578 | 4/2001 |
| KR | 10-2002-0036647 | 5/2002 |
| KR | 1020030045797 A | 6/2003 |
| KR | 1020050081825 A | 8/2005 |
| KR | 1020080068033 A | 7/2008 |

\* cited by examiner

*Primary Examiner* — Ana Woodward
(74) *Attorney, Agent, or Firm* — Cantor Colburn LLP

(57) ABSTRACT

A cross-linked metal-containing polyamic acid includes a metal and a cross-linked polyamic acid which is a condensation product of an acid anhydride represented by Formula 1 and a diamine compound:

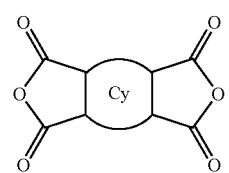

Formula 1 where the

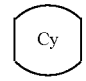

group comprises a C5-C20 carbocycle having a cross-linkable functional group or a C4-C20 heterocycle having a cross-linkable functional group. A cross-linked metal-containing polyimide, a method of manufacturing the cross-linked metal-containing polyimide, a polyimide film including the cross-linked metal-containing polyimide, and a method of making the polyimide film are disclosed.

14 Claims, 5 Drawing Sheets

CROSS-LINKED PRODUCT OF METAL-CONTAINING POLYAMIC ACID, CROSS-LINKED PRODUCT OF METAL-CONTAINING POLYIMIDE INCLUDING THE CROSS-LINKED PRODUCT OF METAL-CONTAINING POLYAMIC ACID, METHOD OF MANUFACTURING THE CROSS-LINKED PRODUCT OF METAL-CONTAINING POLYIMIDE, AND POLYIMIDE FILM INCLUDING THE CROSS-LINKED PRODUCT OF METAL-CONTAINING POLYIMIDE

CROSS-REFERENCE TO RELATED APPLICATIONS

This application claims priority to Korean Patent Application No. 10-2009-0020360, filed on Mar. 10, 2009, and 10-2010-0003948, filed on Jan. 15, 2010, and all the benefits accruing therefrom under 35 U.S.C. 119, the contents of which in their entireties are herein incorporated by reference.

BACKGROUND

1. Field

One or more embodiments relate to a cross-linked metal-containing polyamic acid cross-linked at low temperature, a cross-linked metal-containing polyimide including the cross-linked metal-containing polyamic acid, a method of manufacturing the cross-linked metal-containing polyamic acid and the cross-linked metal-containing polyimide, and a polyimide film including the cross-linked metal-containing polyimide.

2. Description of the Related Art

Ultra-light, low-powered, and flexible displays are used to display a variety of electronic information. Manufacture of flexible displays involves preparing flexible substrates with flexible electronic components prepared from organic and inorganic compositions for low temperature processes compatible with flexible substrates, and flexible encapsulating and packaging technologies for the electronic components. In this regard, the flexible substrate is an essential and integral component of the flexible display, and is determinative of the performance, reliability, and cost of the flexible displays.

A plastic flexible substrate may be used as the flexible substrate because it may be readily processed by current processing methods, has low weight, and is suitable for use in a continuous process.

However, since plastic substrates generally have low thermal stability relative to, for example, inorganic or ceramic substrates, there is significant room for improvement in properties of plastic substrates to render them suitable for practical use. Thus even polyimide polymers, which may be used to form plastic substrates and which have excellent thermal resistance, may be improved upon.

Polyimides, generally, comprise an electron-donor having a nitrogen atom as a core and an electron-acceptor having a carbonyl group as a core form a charge transfer complex within polymers or between polymers. Polyimides therefore possess an intrinsic color, and may be used to form a substrate by reducing the coefficient of thermal expansion ("CTE") and increasing optical transmittance.

SUMMARY

One or more embodiments include a cross-linked metal-containing polyimide having excellent optical properties and thermal properties, a cross-linked metal-containing polyamic acid which is a precursor of the cross-linked metal-containing polyimide, a method of manufacturing the cross-linked metal-containing polyamic acid and the cross-linked metal-containing polyimide, and a polyimide film including the cross-linked metal-containing polyimide.

One or more embodiments include a cross-linked metal-containing polyamic acid including:
a metal; and
a cross-linked polyamic acid which is a condensation product of an acid anhydride represented by Formula 1 and a diamine compound:

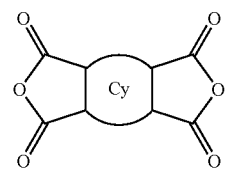

Formula 1 wherein the

includes a C5-C20 carbocycle having a crosslinkable functional group or a C4-C20 heterocycle having a cross-linkable functional group.

One or more embodiments may include a cross-linked metal-containing polyimide including:
a metal; and
a cross-linked polyimide which is a condensation product of an acid anhydride represented by Formula 1 and a diamine compound and imidization of the condensation resultant.

To achieve the above and/or other aspects, one or more embodiments may include a method of manufacturing a cross-linked metal-containing polyimide, the method including:
preparing a polyamic acid by performing a condensation reaction between an acid anhydride represented by Formula 1 below and a diamine compound;
preparing a cross-linked metal-containing polyamic acid by low temperature cross-linking of the polyamic acid in the presence of an organic metal catalyst; and
imidizing the cross-linked polyamic acid with a heat-treatment process at a temperature of from 200 to 270° C. to obtain the cross-linked metal-containing polyimide.

One or more embodiments may include a polyimide film including the cross-linked metal-containing polyimide.

One or more embodiments may include a method of forming a polyimide film, the method including:
preparing a polyamic acid by performing a condensation reaction between an acid anhydride represented by Formula 1 below and a diamine compound;
preparing a cross-linked metal-containing polyamic acid by cross-linking the polyamic acid in the presence of an organic metal catalyst;
casting the cross-linked metal-containing polyamic acid onto a substrate; and
imidizing the cross-linked metal-containing polyamic acid with a heat-treatment process at a temperature of from 200 to 270° C. to obtain the polyimide film.

One or more embodiments may include a reaction product of an acid anhydride represented by Formula 1, a diamine compound represented by Formula 4, and an organic metal catalyst represented by Formula 7, $$(L)_n M=C(R)_2 \qquad \text{Formula 7}$$

where M is a transition metal, L is a ligand, n is an integer of from 1 to 5, and each R is independently H or an organic group. A polyamic acid is formed from the acid anhydride and diamine, a cross-linked metal-containing polyamic acid is formed by cross-linking the polyamic acid in the presence of the organic metal catalyst, and a cross-linked metal-containing polyimide is formed by heat-treating and imidization of the cross-linked metal-containing polyamic acid.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
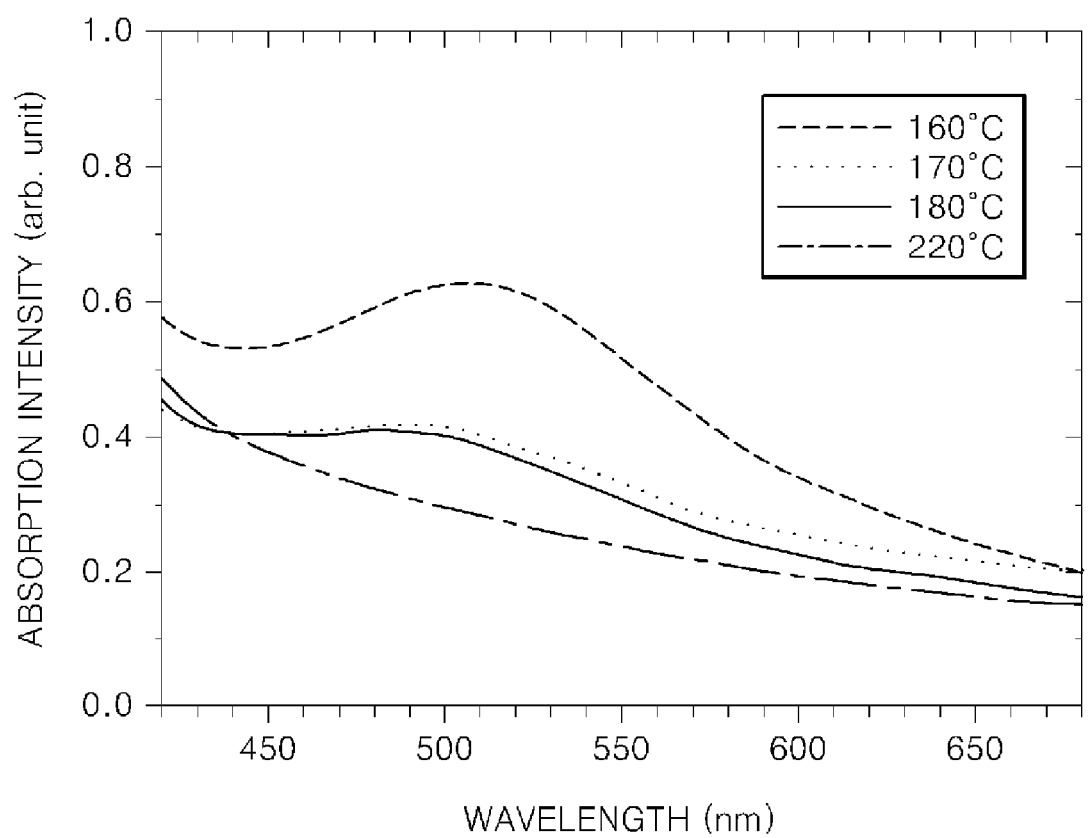
FIG. 1 is a graph illustrating temperature-dependent light absorbance properties of an exemplary cross-linked film of metal-containing polyamic acid prepared according to Synthesis Example 1-1.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, regions, integers, steps, operations, elements, and/or components, but do not preclude the presence or addition of one or more other features, regions, integers, steps, operations, elements, components, and/or groups thereof. All ranges and endpoints reciting the same feature are independently combinable.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As disclosed herein, an acid anhydride having a double bond is used, along with a diamine, to synthesize a polyamic acid to prepare in turn a polyimide having excellent optical properties and thermal properties. The polyimide is a metal containing polyimide.

A cross-linked metal-containing polyimide may be prepared by cross-linking polyamic acid by cross-linking double bonds of the polyamic acid at a low temperature, preparing a cross-linked metal-containing polyamic acid by removing colored catalyst-related impurities, and imidizing the cross-linked metal-containing polyamic acid at a relatively low temperature.

The metal contained in the cross-linked metal-containing polyamic acid and the cross-linked metal-containing polyimide is derived from a crosslinking catalyst, and may include at least one selected from the group consisting of ruthenium (Ru), tungsten (W), molybdenum (Mo), osmium (Os), titanium (Ti), nickel (Ni), tantalum (Ta), zirconium (Zr), platinum (Pt), palladium (Pd), gold (Au), and any combination thereof. In an embodiment, the metal contained in the cross-linked metal-containing polyamic acid and/or polyimide is the reaction residue of a metal catalyst.

The amount of the metal in the cross-linked metal-containing polyamic acid may be from about 0.0001 to about 2.5 weight percent (wt %), for example about 0.001 to about 2.0 wt %, and in a further example from about 0.005 to about 1.0 wt %, based on the total weight of the cross-linked metal-containing polyamic acid.

The amount of the metal in the cross-linked metal-containing polyimide may be from about 0.0001 to about 2.5 wt %, for example about 0.001 to about 2.0 wt %, and in a further example from about 0.005 to about 1.0 wt %, based on the total weight of the cross-linked metal-containing polyimide.

If the amount of the metal is within the range described above in the cross-linked metal-containing polyamic acid and metal-containing polyimide, the cross-linked metal-containing polyamic acid and metal-containing polyimide prepared therefrom may have improved physical properties compared with non-crosslinked or thermally crosslinked polyimides, without any remaining unreacted cross-linkable functional groups.

The type and amount of the metal contained in the cross-linked polyamic acid and the cross-linked polyimide may be identified by known analytical techniques such as, for example, inductively coupled plasma ("ICP") analysis.

The degree of cross-linking in the cross-linked metal-containing polyamic acid and the cross-linked metal-containing polyimide may be identified by infrared ("IR") spectroscopy, and the structure thereof may be identified by nuclear magnetic resonance ("NMR") spectroscopy.

The cross-linked metal-containing polyamic acid that is a condensation product of an acid anhydride represented by Formula 1 below and a diamine compound. The condensation product is prepared by condensation-polymerizing the acid anhydride and the diamine compound to produce a polyamic acid, and cross-linking the polyamic acid.

The cross-linked metal-containing polyimide is similarly a product of condensation reaction of the acid anhydride of Formula 1 and the diamine compound and imidization thereof. The cross-linked metal-containing polyimide is prepared by performing condensation-polymerization reaction of the acid anhydride and the diamine compound to prepare the polyamic acid, cross-linking the polyamic acid, and performing imidization of the polyamic acid.

Hereinafter, a method of manufacturing a cross-linked metal-containing polyamic acid and a cross-linked metal-containing polyimide using the cross-linked metal-containing polyamic acid will be described.

First, a polyamic acid is prepared by combining an acid anhydride represented by Formula 1 below, and a diamine compound. The acid anhydride and diamine may be combined in the presence of a solvent.

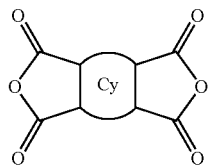

Formula 1 wherein the

group may be a single ring, multiple ring, or fused ring C5-C20 carbocycle having a cross-linkable functional group or a single ring, multiple ring, or fused ring C4-C20 heterocycle having a cross-linkable functional group.

The single ring, multiple ring, or fused ring C5-C20 carbocycle of Formula 1 having a cross-linkable functional group may be a single ring, multiple ring, or fused ring cycloalkene, cycloalkyne, bicycloalkene, tricycloalkene, or the like, or any combination thereof, which includes a functional group that can participate in cross-linking with the metal, such as a double bond or a triple bond, or any combination thereof. The single ring, multiple ring, or fused ring C4-C20 heterocycle having a cross-linkable functional group may be single ring, multiple ring, or fused ring heterocycloalkene, heteocycloalkyne, biheterocycloalkene, triheterocycloalkene, or the like, or any combination thereof, which includes a functional group participating in cross-linking, such as a double bond or a triple bond, or any combination thereof.

In the

group, the cross-linkable functional group indicates a moiety having an unsaturated bond such as a double bond and a triple bond. Thus, in an embodiment, a polyimide comprising Formula 1 contains as a crosslinking site an unsaturated carbon-carbon bond.

In Formula 1, the

group may be a bicyclo[2.2.2]ene group having a structure

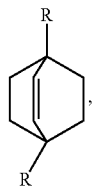

wherein R may be one selected from the group consisting of a hydrogen atom, a C1-C10 alkyl group, a C1-C10 alkyloxy group, a C6-C10 aryl group, or a halogen atom. In an embodiment, the anhydride rings each form a [3.4.0] fused ring system with the bicyclo[2.2.2]ene group. In other embodiments, the anhydride rings may be attached by a single bond.

In an exemplary embodiment, where the anhydride groups are fused to the a bicyclo[2.2.2]ene group, the acid anhydride of Formula 1 may be a compound represented by Formula 2 below.

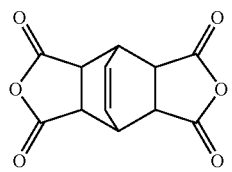

Formula 2

The C1-C10 alkyl group may be a methyl group or an ethyl group; the C1-C10 alkyloxy group may be a methoxy group or an ethoxy group; the C6-C10 aryl group may be a phenyl group; and the halogen atom may be bromine, fluorine, or chlorine.

In addition to the acid dianhydride of Formula 1, an additional dianhydride of Formula 3 without a crosslinkable functional group may be included to form a copolymer.

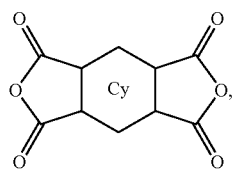

Formula 3 where

is a trivalent or a quadrivalent organic group selected from the group consisting of a substituted or unsubstituted C4-C20 carbon cyclic group, a substituted or unsubstituted C6-C20 monocyclic aromatic group, and a substituted or unsubstituted C2-C20 condensed polycyclic aromatic group, an interconnected C2-C20 non-condensed polycyclic aromatic group via interconnected by a substituted or unsubstituted aromatic group, and any combination thereof. An interconnected C2-C20 non-condensed polycyclic aromatic group that is interconnected via an aromatic group refers to an aromatic group system in which several cycles are connected to one another directly via by an aromatic group or via a linker.

Examples of the acid anhydride of Formula 3 include 4,4-biphthalic dianhydride ("BPDA"), 3,3",4,4"-diphenylsulfone tetracarboxylic dianhydride ("DSDA"), 3,3",4,4"-benzophenonetetracarboxylic dianhydride ("BTDA"), 4,4"-(hexafluoroisopropylidene)diphthalic anhydride ("6FDA"), 4,4"-oxydiphthalic anhydride ("ODPA"), pyromellitic dianhydride ("PMDA"), and (4-(2,5-dioxotetrahydrofuran-3-yl)-1,2,3,4-tetrahydronaphthalene-1,2-dicarboxylic anhydride ("DTDA"), or the like, or any combination thereof.

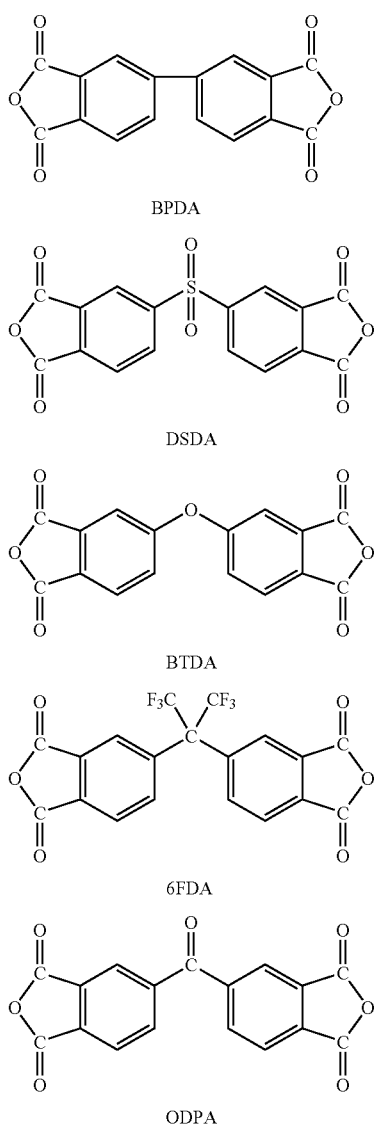

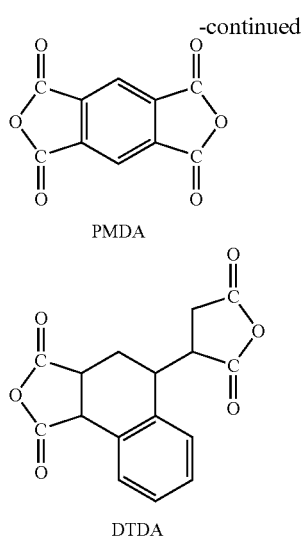

Where a combination of dianhydrides of Formula 1 and Formula 3 are used, the dianhydrides may be combined in a molar ratio of 1:99 to 99:1, provided the amount of Formula 1 is sufficient to provide a crosslinked polyimide having the desired properties disclosed herein.

The acid dianhydride of Formula 1 is condensed with the diamine to form the polyamic acid. In an embodiment, the diamine is an aromatic diamine. The diamine compound may be represented by the following Formula 4.

$$H_2N-A-NH_2 \qquad \text{Formula 4}$$

In Formula 4, A may be one selected from the group consisting of

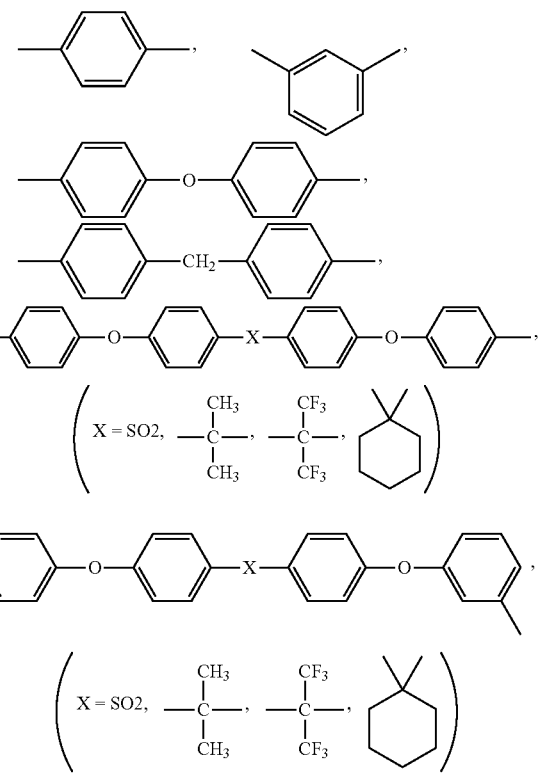

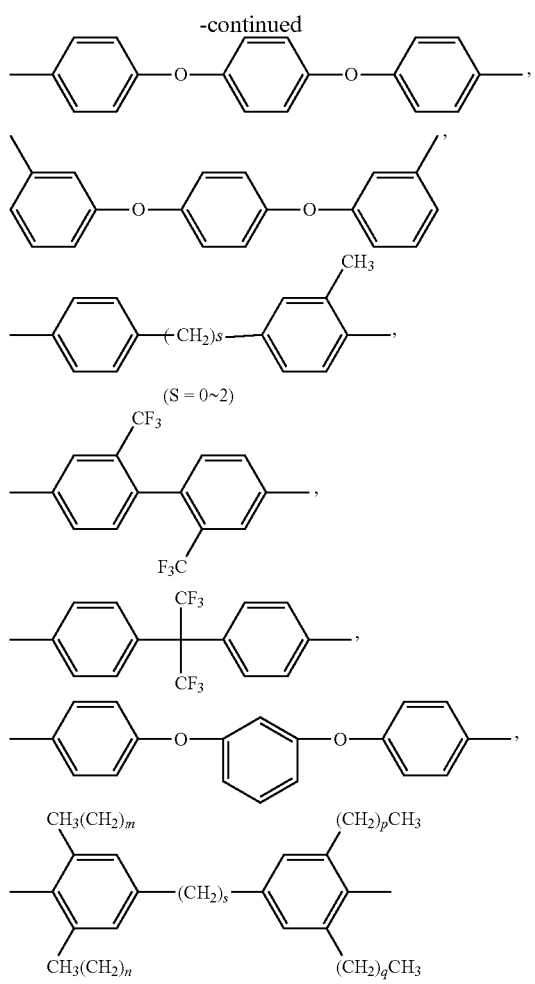

wherein m, n, p, and q are each independently an integer of 0 to 18, and s is an integer of 0 to 2,

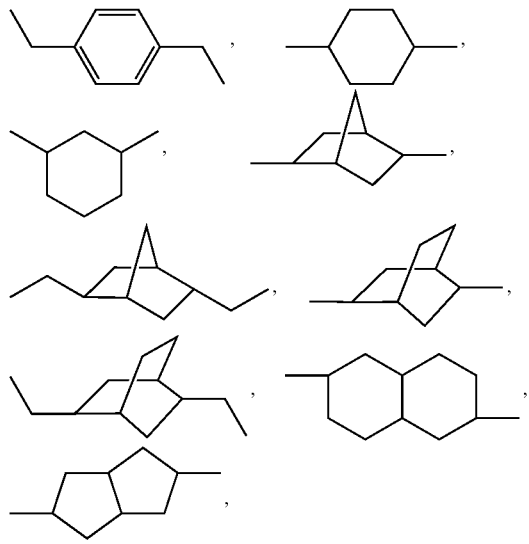

and any combination thereof.

The amount of the diamine compound represented by Formula 4, i.e., an aromatic diamine, may be from about 0.5 to about 1.5 moles, for example from about 0.6 to about 1.4 moles, and in a further example from about 0.75 to about 1.25 moles, based on 1 mole of the acid anhydride represented by Formula 1. If the amount of the diamine compound represented by Formula 4 is within this range, the cross-linked metal-containing polyamic acid or crosslinked metal-containing polyimide may have desirable properties including crosslinkability, heat resistance, and the like.

In an exemplary embodiment, the diamine compound of Formula 4 may be bis[4-(3-aminophenoxy)phenyl]sulfone ("BAPS") represented by Formula 5 or 2,2-bis[4-(4-aminophenoxy)phenyl]propane ("BAPP") represented by Formula 6.

Formula 5

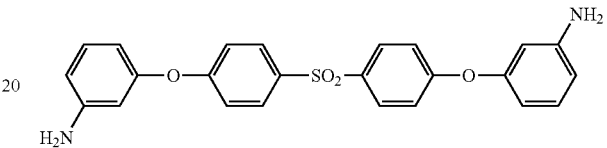

Formula 6

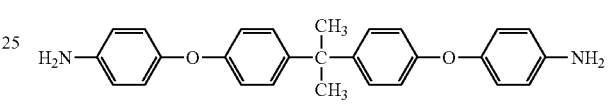

The acid dianhydride and diamine are combined in the presence of a solvent. The solvent may be a polar aprotic solvent such as N,N-dimethyl acetamide ("DMAc"), dimethylsulfoxide ("DMSO"), N-methylpyrrolidone, N,N-dimethylformamide, N-methyl caprolactam, pyridine, tetrahydrofuran, cyclohexanone, 1,4-dioxane, or the like, or any combination of these.

The amount of acid anhydride of Formula 1 may be about 5 to about 50 parts by weight based on 100 parts by weight of the solvent. Where the amount of acid anhydride of Formula 1 is within this range, a film may be formed efficiently.

The polyamic acid may be prepared at a temperature of from about 0 to about 200° C. If the polyamic acid is prepared at a temperature within this range, the polyamic acid can form efficiently without reduction or loss of molecular weight of the polyamic acid that may be caused by the reverse reaction.

The polyamic acid is cross-linked in the presence of an organic metal catalyst at low temperature to form a cross-linked metal-containing polyamic acid. Generally, organic metal catalysts suitable for use as crosslinkers are those useful as metathesis catalysts. Such catalysts include as structural features a metal center doubly bonded to a carbon center as a ligand, and having a general structure of Formula 7:

$$(L)_n M=C(R)_2 \quad \text{Formula 7}$$

where M is a transition metal capable of forming a stable carbene complex, L represents a ligand, n is an integer describing an appropriate number of heteroatom or carbon-based ligands, where for example n may be 1 to 5, and each R is independently H or an organic group such as an alkyl or aromatic group. Unless otherwise specified, ligand L in Formula 7 may be mono-, bi-, tri- or polydentate.

In Formula 7, metals M may include at least one selected from the group consisting of ruthenium (Ru), tungsten (W), molybdenum (Mo), osmium (Os), titanium (Ti), nickel (Ni), tantalum (Ta), zirconium (Zr), platinum (Pt), palladium (Pd), and gold (Au). Ligands L may include, halogens such as Cl and Br, C1-C20 alkyl groups such as methyl, ethyl, isopropyl, butyl, or the like; C6-C20 aromatic groups such as substituted or unsubstituted phenyl, tolyl, mesityl, or the like; heteroatom-containing ligands including amines such as ammonia, mono-, di- and trialkylamines and polyamines such as methylamine, ethylamine, dimethylamine, diethylamine, diisopropylamine, trimethylamine, triethylamine, ethylenediamine, tetramethylethylene diamine, diethylene triamine, or the like; cyclic amines such as pyridines, piperidines, imidazoles, pyrrolidines, piperidines, pyrazines, imidazolidines including N,N'-disubstituted imidazolidines and imidazolidynilidenes such as N,N'-dimesitylimidazolidine, oxazoles, thiazoles, or the like; oxygen-containing ligands including alkoxides, haloalkoxides, and the like, sulfur compounds such as methanethiol, ethanethiol, dimethylsulfide, or the like; phosphorus-containing ligands such as trimethylphosphine, triethylphosphine, triisopropylphosphine, tributylphosphine, tricyclohexylphosphines, substituted or unsubstituted aminoalkyldicyclohexylphosphines or heterocycloalkyldicyclohexylphosphines including quaternary ammonium salts thereof, bi- or multidentate ligands such as salicylates, salicylimides, bipyridyls, diphosphines such as ethylene(bis-diphenylphosphine), binaphthyls including diphosphine binaphthyls, phenanthrolines, bis(dibenzylidene)acetones, or the like; and combinations comprising at least one of the foregoing. It will be appreciated that the above non-exhaustive list of ligands is exemplary and should not be considered as limiting to these.

In an embodiment, the organic metal catalyst may include at least one selected from the group consisting of a ruthenium-based complex as a ruthenium carbene catalyst, a tungsten-based complex, a molybdenum-based complex, an osmium-based complex, a titanium-based complex, a nickel-based complex, a tantalum-based complex, a zirconium-based complex, a platinum-based complex, a palladium-based complex, and a gold-based complex.

Exemplary organic metal catalysts may include compounds represented by Formulae 8 to 19 below, benzylidene [1,3-bis(2,4,6-trimethylphenyl)-2-imidazolidinylidene] dichloro(tricyclophosphine) ruthenium, or the like. Combinations comprising at least one of the foregoing may also be used.

Formula 8

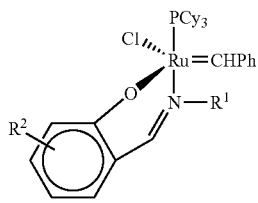

In Formula 8, $R^1$ is a hydrogen atom or a C1-C10 alkyl group, $R^2$ is a hydrogen atom or a halogen atom, $PCy_3$ is tricyclohexylphosphine, and Ph is a phenyl group.

Formula 9

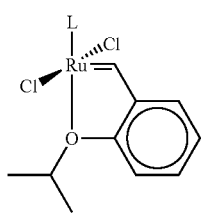

In Formula 9, L is 1,3-bis-(2,4,6-trimethylphenyl)-2-imidazolidinylidene.

Formula 10

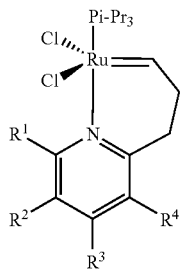

In Formula 10, $R^1$ to $R^4$ are each independently a hydrogen atom or a halogen atom, and $P(i-Pr)_3$ is triisopropylphosphine.

Formula 11

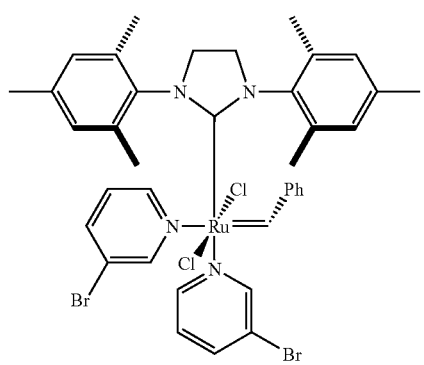

In Formula 11, Ph is a phenyl group.

Formula 12

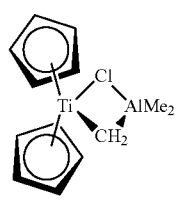

In Formula 12, Me is a methyl group.

Formula 13

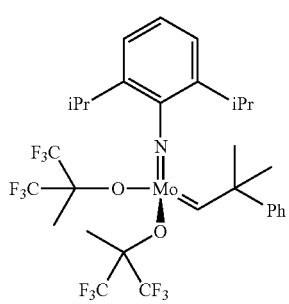

In Formula 13, iPr is an isopropyl group and Ph is a phenyl group.

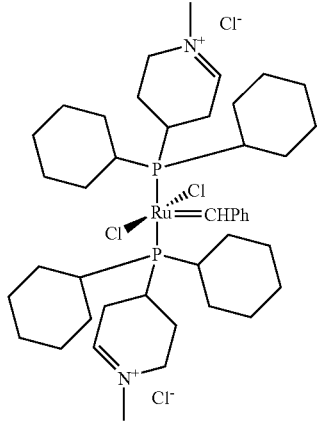

Formula 14

In Formula 14, Ph is a phenyl group.

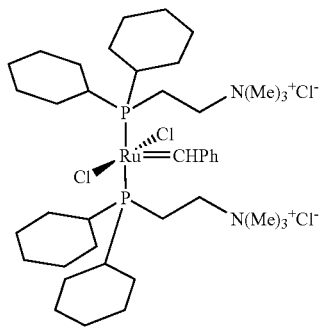

Formula 15

In Formula 15, Ph is a phenyl group and Me is a methyl group.

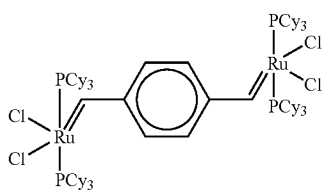

Formula 16

In Formula 16, $PCy_3$ is tricyclohexylphosphine.

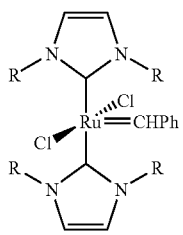

Formula 17

In Formula 17, R is mesitylene, and Ph is a phenyl group.

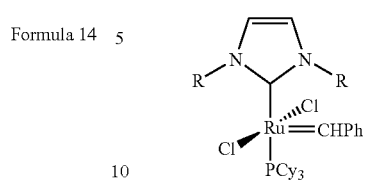

Formula 18

In Formula 18, R is mesitylene, $PCy_3$ is tricyclohexylphosphine, and Ph is a phenyl group.

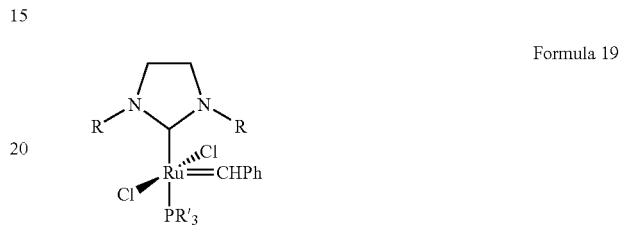

Formula 19

In Formula 19, $PR'_3$ is a trialkyl phosphine, R is mesitylene, and Ph is a phenyl group.

The amount of the organic metal catalyst may be from about 0.001 to about 5 wt %, for example about 0.01 to about 5 wt %, and in a further example about 0.1 to about 4 wt %, based on the total weight of polyamic acid and the organic metal catalyst. Where the amount of organic metal catalyst is less than 0.001 wt %, an insufficient degree of crosslinking may result and unreacted crosslinking sites on the polyimide may remain. Where the amount of catalyst is greater than 5 wt %, excess organic metal complex may be present. However, if the amount of the organic metal catalyst is within this range, little or no unreacted cross-linkable functional group may remain, and the cross-linked metal-containing polyamic acid having at least the desirable properties disclosed herein may be obtained.

The low temperature cross-linking may be performed at a temperature of from about 20 to about 150° C., for example about 25 to about 125° C., and in a further example from about 30 to about 100° C.

During low temperature cross-linking, cross-linkable functional groups of the polyamic acid, e.g., the double bonds of the polyamic acid, cross-link to form the cross-linked polyamic acid.

Then, the resultant cross-linked product is heat-treated at a high temperature of from about 80 to about 250° C., for example about 90 to about 225° C., and in a further example from about 100 to about 200° C. to reduce or remove the unreacted organic metal catalyst and other remaining residues and by-products. To further reduce these residual species, the resultant cross-linked product may be treated at a reduced pressure of from about $1.0 \times 10^{-6}$ to about 0.1 atm (about 0.1 Pa to about 10.0 kPa).

Then, the resultant cross-linked polyamic acid is heat-treated at a temperature ranging from about 200 to about 270° C., for example about 210 to about 260° C. to imidize the polyamic acid and to form a cross-linked metal-containing polyimide. In a specific embodiment, the heat-treatment may be performed at a temperature of from about 230 to about 250° C. Where the heat-treatment is performed within the temperature range described above, the cross-linked metal-containing polyimide may be formed without loss of reactivity of the polyamic acids from imidization at too low a temperature (i.e., less than 200° C.).

In this way, a reaction product of an acid anhydride of Formula 1, a diamine compound of Formula 4, and an organic metal catalyst of Formula 7, may be formed. In forming the reaction product, a polyamic acid is first formed from the acid anhydride and diamine, a cross-linked metal-containing polyamic acid is next formed by cross-linking the polyamic acid in the presence of the organic metal catalyst, and a cross-linked metal-containing polyimide is then formed by heat-treating and imidization of the cross-linked metal-containing polyamic acid.

A mechanism for synthesizing the cross-linked polyamic acid and the cross-linked polyimide is illustrated in Reaction Scheme 1 below.

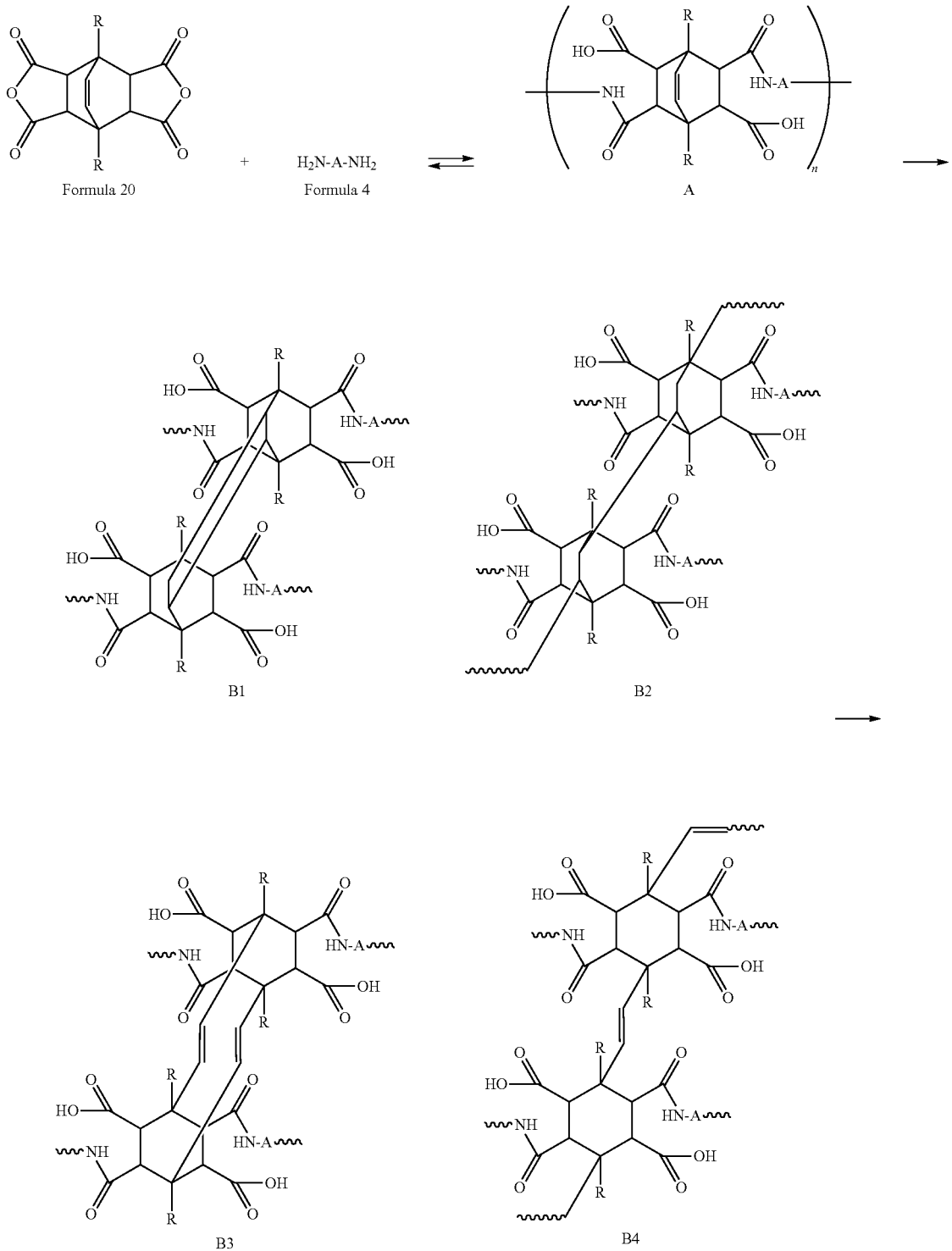

-continued

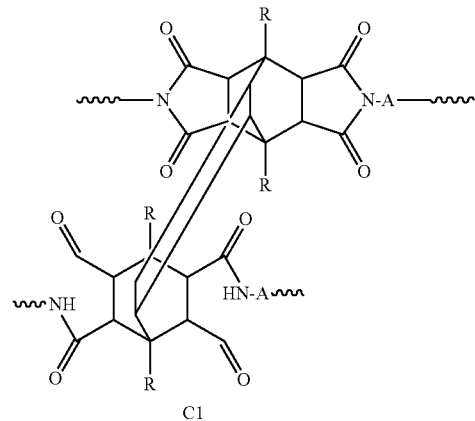

C1

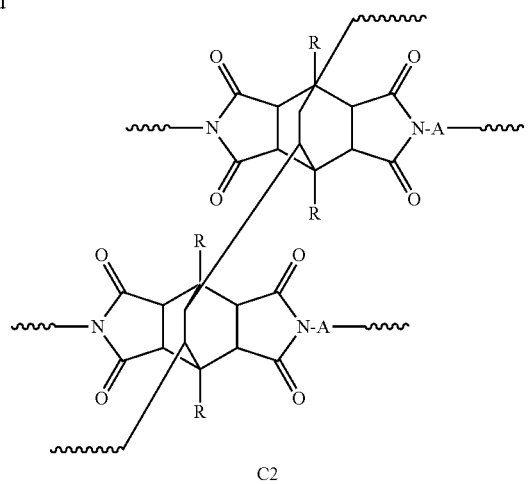

C2

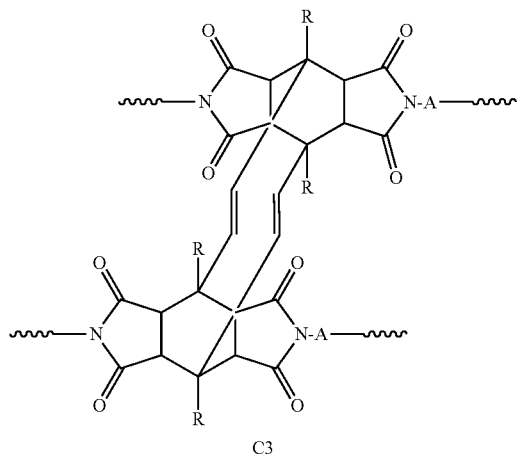

C3

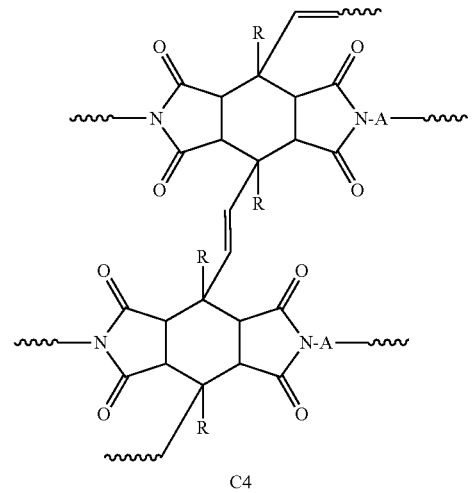

C4

In Reaction Scheme 1, a crosslinkable acid anhydride of Formula 20 is condensed with a diamine of Formula 4 to form a polyamic acid A. The polyamic acid A is then crosslinked to form a polyamic acid. While not wishing to be bound by theory, it is believed that the crosslinked product includes a combination of crosslinked substructures B1 and B2. Substructure B1 is a dimeric 2+2 cycloaddition product of the olefinic groups on Formula 20, and substructure B2 is an olefin addition product of the substructures. Alternatively, or in addition depending on the choice of organic metal catalyst, the cross-linked polyamic acid may contain a ring-opening metathesis crosslinking structure B3, which is a dimeric metathesis product, or B4, which is a polymeric ring-opening metathesis substructure. Each of these substructures B1-B4 may be obtained from the reaction of the olefinic groups of Formula 20 with the organic metal catalyst.

Subsequently, the crosslinked polyamic acid is crosslinked to form crosslinked imide substructures C1-C4, corresponding to the polyamic acid substructures B1-B4, respectively. It will be appreciated by the skilled artisan that one or more of the foregoing substructures may be present in the crosslinked polyamic acid and crosslinked polyimide polymer.

Also in Reaction Scheme 1, each R is independently a hydrogen atom, a methyl group, an ethyl group, a phenyl group, a halogen atom, a methoxy group, or an ethoxy group, and A is one selected from the group consisting of

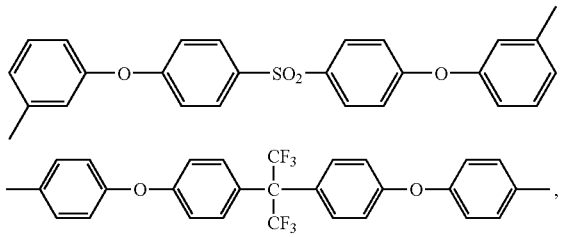

and a combination thereof, wherein n is an integer of from about 10 to about 500.

The halogen atom may be fluorine, chlorine, bromine, or the like.

The cross-linked metal-containing polyamic acid may include a moiety represented by Formula 18 below.

Formula 18

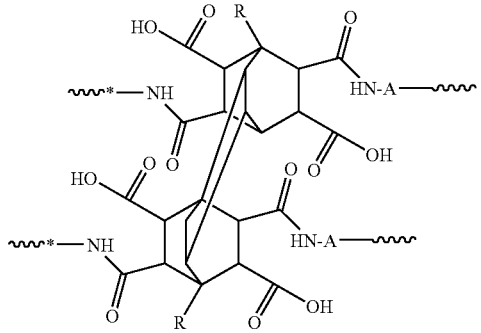

In Formula 18, R is a hydrogen atom, a methyl group, an ethyl group, a phenyl group, a halogen atom, a methoxy group, or an ethoxy group, and A is one selected from the group consisting of

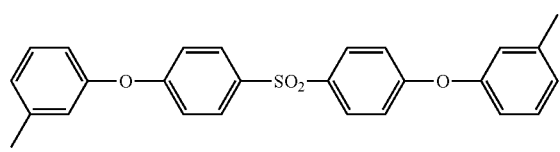

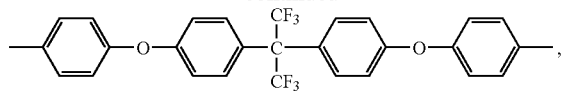

and a combination thereof.

The cross-linked metal-containing polyamic acid may include a moiety represented by Formula 19 below.

Formula 19

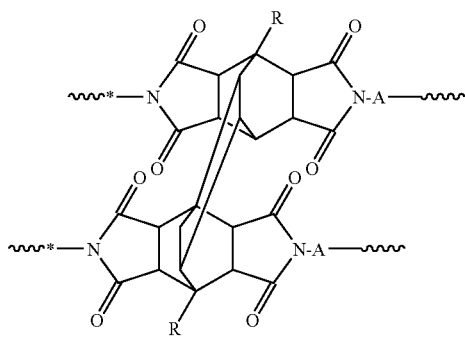

In Formula 19, each R is independently a hydrogen atom, a methyl group, an ethyl group, a phenyl group, a halogen atom, a methoxy group, or an ethoxy group, and A is one selected from the group consisting of and a combination thereof.

The weight average molecular weight of the cross-linked metal-containing polyamic acid may be from about 10,000 to about 1,000,000 g/mol, for example about 20,000 to about 500,000 g/mol. The degree of polymerization for the cross-linked, metal containing polyamic acid is an integer of from about 1 to about 500, for example from about 5 to about 400.

Similarly, the weight average molecular weight of the cross-linked metal-containing polyimide may be from about 10,000 to about 1,000,000 g/mol, for example about 20,000 to about 500,000 g/mol. The degree of polymerization for the cross-linked, metal containing polyimide is an integer of from about 1 to about 500, for example from about 5 to about 400.

The degree of cross-linking and the degree of imidization in the cross-linked metal-containing polyimide may be determined by Fourier-Transform infrared ("FT-IR") spectrophotometry.

A method of measuring the degree of cross-linking and the degree of imidization of the cross-linked metal-containing polyimide will be described.

The degree of cross-linking may be measured by detecting a C=C alkenyl peak (C=C alkenyl out of plane bend) at a wavelength of 694 cm$^{-1}$ in the non-crosslinked polyamic acid. After the cross-linking is performed, the C=C alkyl peak is observed at the wavelength of 694 cm$^{-1}$. The degree of cross-linking may be calculated based on the existence of the C=C alkyl peak, or a relative degree of cross-linking may be calculated by comparing integrated peak areas for that of the peaks corresponding to the non-crosslinked and crosslinked polyamic acids.

In addition, the degree of imidization may be measured by observing a C—N—C peak (C—N—C stretching of imide ring) at a wavelength of 1378 cm$^{-1}$ and a C—N/N—H peak (C—N/N—H coupled deformation of amide) at a wavelength of 1587 cm$^{-1}$.

The degree of cross-linking of the cross-linked metal-containing polyimide according to an embodiment may be equal to or greater than 80%. The degree of cross-linking of the cross-linked metal-containing polyimide according to an embodiment may also be from about 80 to about 99%. The degree of imidization of the cross-linked metal-containing polyimide according to an embodiment may be equal to or greater than 99%. The degree of imidization of the cross-linked metal-containing polyimide according to an embodiment may also be from about 99 to 100%.

A polyimide film may be manufactured using the cross-linked metal-containing polyimide.

The thickness of the polyimide film is, in an exemplary embodiment, from about 10 to about 200 micrometers (μm).

An average transmittance of a polyimide film according to an embodiment having a thickness of from about 10 to about 200 μm, which is measured by UV spectrophotometry, may be equal to or greater than 80% at a wavelength of 380 to 800 nm.

The yellowness index ("YI") of a polyimide film according to an embodiment having a thickness of from about 10 to about 200 μm may be equal to or less than 10. In a specific embodiment, the YI of the polyimide film may be equal to or less than 5.

An average coefficient of thermal expansion ("CTE") of a polyimide film according to an embodiment having a thickness of from about 10 to about 200 μm may be equal to or less than 50 parts per million (dimensionally) per degree centigrade (ppm/° C.), for example equal to or less than 40 ppm/° C., and in a further example equal to or less than 30 ppm/° C., at a temperature of from about 50 to about 200° C., and for example, from about 50 to about 150° C.

When the transmittance is measured, a cut off wavelength may be equal to or less than 400 nm, for example equal to or less than 375 nm, and in a further example equal to or less than 350 nm. Here, the term "cut off wavelength" indicates that transmittance of light having the wavelength is zero (0) %.

The polyimide film according to an embodiment has improved thermal stability, electrical properties, and physical properties such as for example tensile strength, and transparency, when compared to polyimide films prepared by other crosslinking methods. Due to these properties, the polyimide film may be used as an optical film, a compensation film of liquid crystal displays and organic light emitting devices, an alignment film of liquid crystal displays, a waveguide, a protective film for solar cells, a radio-frequency identification ("RFID") substrate, and a protective layer of other devices.

An alkyl group as disclosed herein may not be substituted, or at least one hydrogen atom of the alkyl group may be substituted. "Substituted" herein means having a hydrogen replaced with a halogen atom, a C1-C20 alkyl group substituted with a halogen atom (e.g.: $CF_3$, $CHF_2$, $CH_2F$, or $CCl_3$), a hydroxy group, a nitro group, a cyano group, an amino group, an amidino group, hydrazine, hydrazone, carboxylic acid or salts thereof, sulfonic acid or salts thereof, phosphoric acid or salts thereof, a C1-C20 alkyl group, a C2-C20 alkenyl group, a C2-C20 alkynyl group, a C1-C20 heteroalkyl group, a C6-C20 aryl group, a C7-C20 arylalkyl group, a C2-C20 heteroaryl group, or a C6-C20 heteroarylalkyl group.

An aryl group as disclosed herein is an aromatic system having one or more rings which may be fused or connected to each other as a pendant group. The aryl group may not be substituted, or at least one hydrogen atom of the aryl group may be substituted with the substituents described with reference to the alkyl group.

The carbocycle group used herein may not be substituted, or at least one hydrogen atom of the carbocyclic group may be substituted with the substituents described with reference to the alkyl group.

The heterocycle group used herein is a cyclic group including a heteroatom such as, for example, N, S, P, O, and any combination thereof. The heterocyclic group may not be substituted or at least one hydrogen atom of the heterocyclic group may be substituted with the substituents described with reference to the alkyl group.

Hereinafter, one or more embodiments will be described in detail with reference to the following examples. However, these examples are illustrative and not intended to limit the purpose and scope of the embodiments.

SYNTHESIS EXAMPLE 1-1

Preparation of Cross-Linked Metal-Containing Polyimide

A solution prepared by dissolving 0.6437 g (2.593 mmol) of the compound represented by Formula 2 in 8.5 ml of N,N-dimethyl acetamide (DMAc) was mixed with a solution prepared by dissolving 1.0656 g (2.463 mmol of BAPS represented by Formula 6 in 8.5 ml of DMAc. The mixture was stirred at room temperature for 18 hours to form polyamic acid.

0.001709 g of benzylidene[1,3-bis(2,4,6-trimethylphenyl)-2-imidazolidinylidene]dichloro(tricyclohexylphosphine)ruthenium as an organic metal catalyst was added to the polyamic acid, and cross-linking was carried out at 50° C. As a result, a cross-linked metal-containing polyamic acid was prepared. The amount of the organic metal catalyst included in the polyamic acid was 0.1 wt % based on the weight of polyamic acid and catalyst.

The cross-linked polyamic acid was immediately cast on a glass substrate, and the resultant was gradually heated to 180° C. The pressure was reduced to 0.001 atm (101 Pa) for 1 hour and increased to atmospheric pressure. Then, the resultant was heated to 250° C. As described above, the color of the resultant was removed by heat-treatment at 180° C. at 0.001 atm (101 Pa) for 1 hour.

The resultant was heated to 250° C. and maintained at 250° C. for 30 minutes, and then the solvent was removed under vacuum to prepare the cross-linked metal-containing polyimide as a film.

FIG. 1 is a graph illustrating light absorbance properties of a cross-linked film of metal-containing polyamic acid prepared according to Synthesis Example 1-1, with respect to heat-treatment temperature. Referring to FIG. 1, it is seen that, based on the decreasing in the absorbance peak at about 510 nm, the light absorbance properties of cross-linked films of metal-containing polyamic acids gradually disappear with increasing temperature, and color-generating species within the cross-linked film of metal-containing polyamic acid were effectively removed with higher temperatures (e.g., 220° C.).

SYNTHESIS EXAMPLE 1-2

Preparation of Cross-Linked Metal-Containing Polyimide

A cross-linked metal-containing polyimide was prepared in the same manner in Synthesis Example 1-1, except that 0.00855 g of benzylidene[1,3-bis(2,4,6-trimethylphenyl)-2-imidazolidinylidene]dichloro(tricyclohexylphosphine)ruthenium as an organic metal catalyst was added to the polyamic acid and thus the amount of the organic metal catalyst used in the preparation of the cross-linked metal-containing polyamic acid was 0.05 wt %.

SYNTHESIS EXAMPLE 1-3

Preparation of Cross-Linked Metal-Containing Polyimide

A cross-linked metal-containing polyimide was prepared in the same manner in Synthesis Example 1-1, except that 0.00171 g of benzylidene[1,3-bis(2,4,6-trimethylphenyl)-2-imidazolidinylidene]dichloro(tricyclohexylphosphine)ruthenium as an organic metal catalyst was added to the polyamic acid and thus the amount of the organic metal catalyst used in the preparation of the cross-linked metal-containing polyamic acid was 0.01 wt %.

COMPARATIVE SYNTHESIS EXAMPLE 1

Preparation of Polyimide in the Same Thermal Conditions as in Synthesis Example 1 without Using the Organic Metal Catalyst A solution prepared by dissolving 0.6437 g (2.593 mmol) of the compound represented by Formula 2 in 8.5 ml of N,N-dimethyl acetamide (DMAc) was mixed with a solution prepared by dissolving 1.0656 g (2.463 mmol) of BAPS represented by Formula 6 in 8.5 ml of DMAc. The mixture was allowed to react at room temperature for 18 hours to prepare polyamic acid.

The resultant was cast on a glass substrate, heated to 250° C. under a nitrogen atmosphere, and treated at the same temperature for 30 minutes. The solvent was removed under vacuum to prepare polyimide.

COMPARATIVE SYNTHESIS EXAMPLE 2

Preparation of Cross-Linked Polyimide by Heat-Treatment at High Temperature without Using an Organic Metal Catalyst A solution prepared by dissolving 0.6437 g (2.593 mmol) of the compound represented by Formula 2 in 8.5 ml of N,N-dimethyl acetamide (DMAc) was mixed with a solution prepared by dissolving 1.0656 g (2.463 mmol) of BAPS represented by Formula 6 in 8.5 ml of DMAc. The mixture was allowed to react at room temperature for 18 hours to prepare polyamic acid.

The polyamic acid was heated to 250° C. and treated at the same temperature for 30 minutes. Then, the resultant was heated to 350° C. and maintained at the same temperature for 30 minutes to prepare a cross-linked polyimide.

Figure 2:
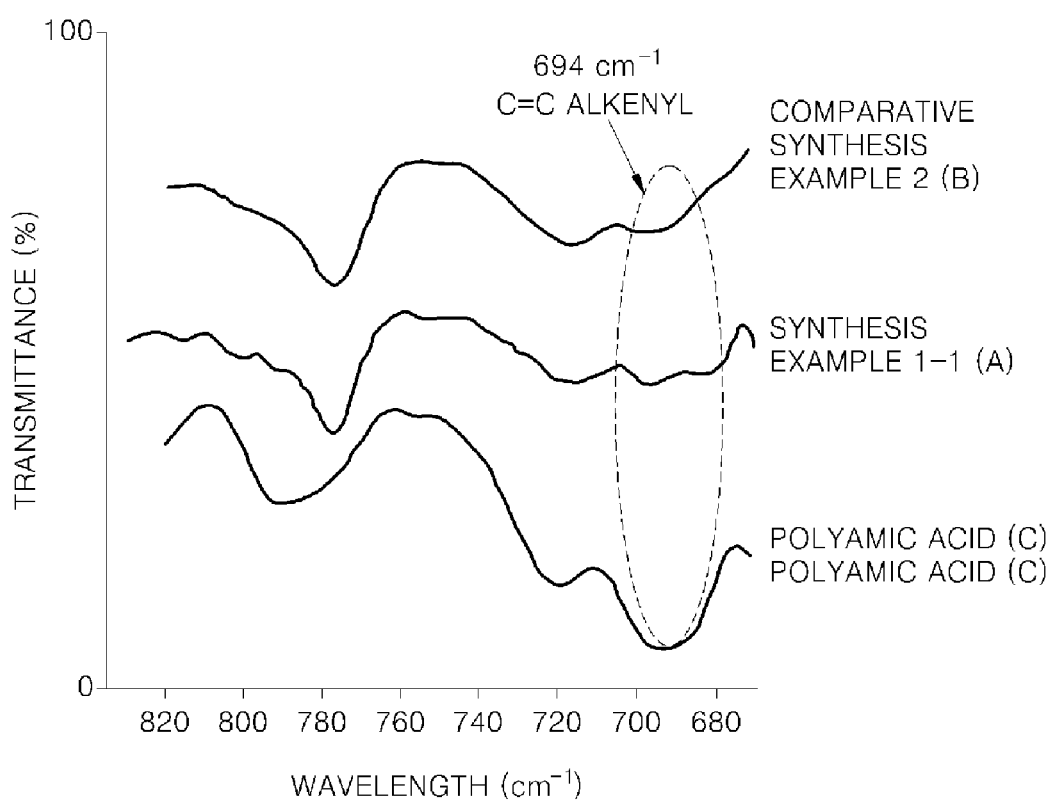
FIG. 2 shows Fourier Transform Infrared ("FT-IR") spectra of a cross-linked metal-containing polyimide prepared according to Synthesis Example 1-1, a cross-linked polyimide prepared according to Comparative Synthesis Example 2, and polyamic acid before cross-linking of Synthesis Example 1-1 and Comparative Synthesis Example 2.

FIG. 2 shows overlaid FT-IR spectra of a cross-linked metal-containing polyimide prepared according to Synthesis Example 1-1 (A in FIG. 2), a cross-linked polyimide prepared according to Comparative Synthesis Example 2 (B in FIG. 2), and a polyamic acid before cross-linking, which has the same composition as that of Synthesis Example 1-1 and Comparative Synthesis Example 2 (C in FIG. 2).

Referring to FIG. 2, it can be seen that excellent cross-linking effect may be obtained using a small amount of the catalyst without heating to a high temperature up to 350° C.

The amount of the metal from the organic metal catalyst, contained in the cross-linked metal-containing polyimide prepared according to Synthesis Examples 1-1 to 1-3, was determined by inductively coupled plasma ("ICP") analysis.

The cross-linked metal-containing polyimide prepared according to Synthesis Examples 1-1 to 1-3 each included Ru.

Yellowness index (YI) for each of the cross-linked metal-containing polyimide prepared according to Synthesis Examples 1-1 to 1-3, polyimide prepared according to Comparative Synthesis Example 1, and cross-linked polyimide prepared according to Comparative Synthesis Example 2 were measured spectrophotometrically and are shown in Table 1 below.

TABLE 1

| | | YI |
|---|---|---|
| Synthesis Example 1-1 | Amount of metal catalyst: 0.1 wt % (0.078 mol %) | 2.69 |
| Synthesis Example 1-2 | Amount of metal catalyst: 0.05 wt % (0.039 mol %) | 2.33 |
| Synthesis Example 1-3 | Amount of metal catalyst: 0.01 wt % (0.008 mol %) | 1.87 |
| Comparative Synthesis Example 1 | No metal catalyst (non-crosslinked) | 1.86 |
| Comparative Synthesis Example 2 | No metal catalyst (thermally crosslinked at 350° C.) | 24.75 |

Referring to Table 1, Comparative Synthesis Example 2 was heat-treated to crosslink the polyamic acid at a high temperature (350° C.) without an organic metal catalyst present. Imidization was subsequently performed at 250° C., and the Yellowness Index was found to be 24.75, which is significantly higher than that observed for the cross-linked metal-containing polyimides of Synthesis Examples 1-1 to 1-3, cross-linked at a low temperature (e.g., 50° C.) in the presence of the organic metal catalyst.

Therefore, Synthesis Examples 1-1 to 1-3 in which imidization is performed at 250° C. after low temperature cross-linking carried out using an organic metal catalyst demonstrates that near colorless (i.e., low YI) and thus highly transparent polyimides may be obtained by the method disclosed herein.

Polyimide films were prepared using the cross-linked metal-containing polyimides according to Synthesis Examples 1-1 to 1-3, polyimide according to Comparative Synthesis Example 1, and cross-linked polyimide according to Comparative Synthesis Example 2. Glass transition temperature (Tg) for each of these polyimide films was measured by DSC, and the results are shown in Table 2 below.

TABLE 2

| | Tg |
|---|---|
| Synthesis Example 1-1 | Not detected |
| Synthesis Example 1-2 | 235° C. |
| Synthesis Example 1-3 | 230° C. |
| Comparative Synthesis Example 1 | 240.6° C. |
| Comparative Synthesis Example 2 | Not detected |

Figure 3:
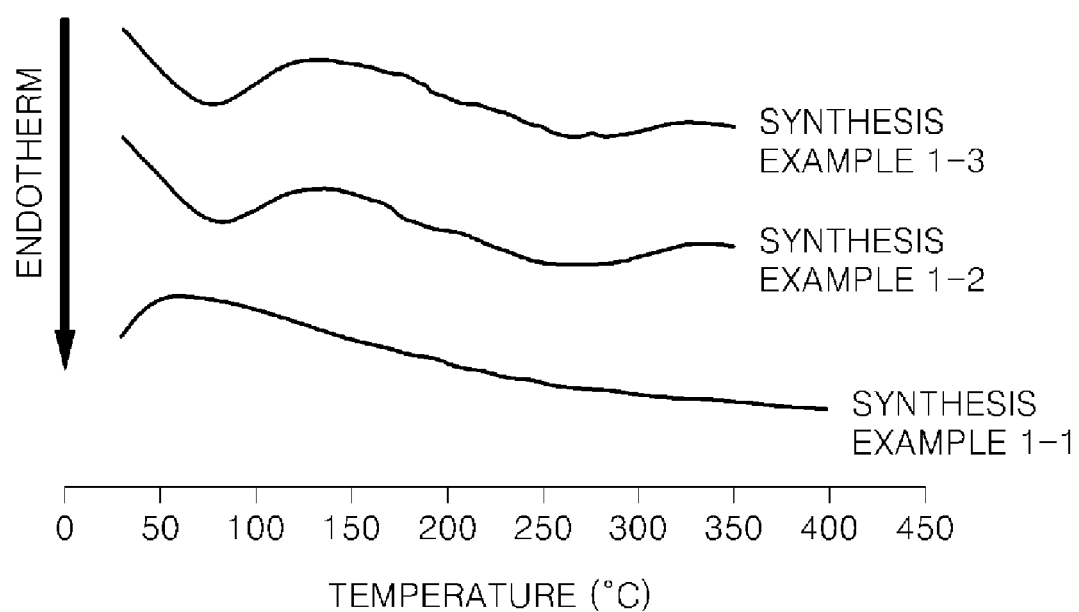
FIG. 3 shows thermal behaviors of exemplary cross-linked metal-containing polyimides prepared according to Synthesis Examples 1-1 to 1-3 measured by differential scanning calorimetry ("DSC")

Table 2 is a summary of Tg data obtained for Synthesis Examples 1-1 to 1-3 and for Comparative Synthesis Examples 1 and 2, and FIG. 3 shows the thermal behavior by differential scanning calorimetry (DSC, scan rate of 10° C./min) of the cross-linked metal-containing polyimides prepared according to Synthesis Examples 1-1 to 1-3.

Referring to Table 2 and FIG. 3, it can be seen that the highest catalyst loading (0.1 wt %) has the greatest degree of crosslinking, where no Tg (and hence the lowest number of degrees of freedom in the crosslinked polymer chain) is observed. Similarly, the Comparative Synthesis Example 2 is highly crosslinked by a high temperature thermal mechanism but has high yellowness index (see Table 1). Synthesis Examples 1-1 (0.1 wt % catalyst), 1-2 (0.05 wt % catalyst) and 1-3 (0.01 wt % catalyst), thus show a clear correlation of increasing Tg with increasing catalyst content. Thus, the degree of cross-linking of the polyimide may be controlled according to the amount of the organic metal catalyst used.

Figure 4:
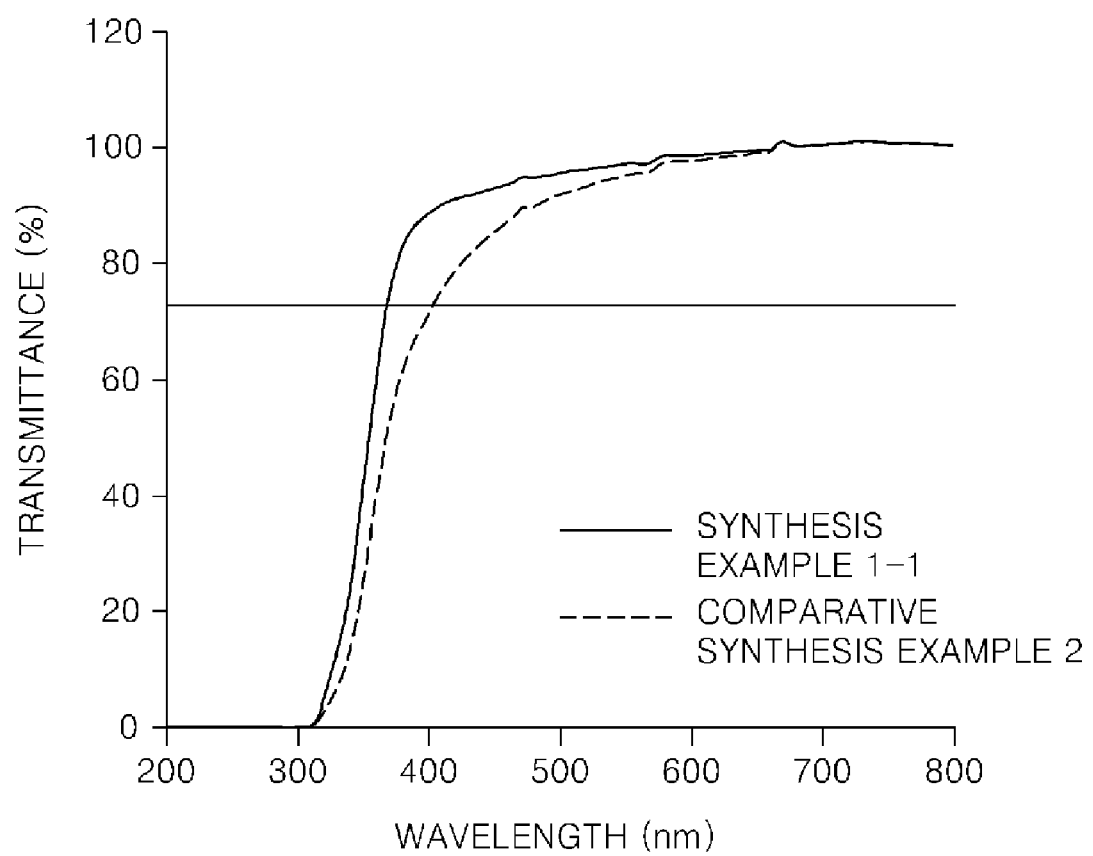
FIG. 4 is a graph illustrating UV-VIS transmittance of cross-linked metal-containing polyimide prepared according to Synthesis Example 1-1 and cross-linked polyimide prepared according to Comparative Synthesis Example 2.

UV-VIS transmittance of the cross-linked metal-containing polyimide according to the Synthesis Example 1-1 and cross-linked polyimide according to Comparative Synthesis Example 2 were measured, and the results are shown in FIG. 4.

Referring to FIG. 4, polyimide according to Comparative Synthesis Example 2 had a more gradual low wavelength cutoff (dashed line) and thus exhibited poor transmittance properties at low wavelength (e.g., less than 400 nm) and was colored (where the dashed line was shifted to higher wavelength relative to Synthesis Example 1-1). In contrast, the cross-linked metal-containing polyimide according to Synthesis Example 1-1 had improved transmittance properties at low wavelength and a greater degree of colorlessness (low YI) and higher transparency than Comparative Synthesis Example 2. Therefore, the cross-linked metal-containing polyimide has improved properties from low temperature cross-linking using organic metal catalyst.

Imidization of the cross-linked metal containing polyamic acid can was also observed by FT-IR. The structure of the cross-linked metal-containing polyimide according to the Synthesis Example 1-1 was identified using FT-IR of FIG. 5.

Figure 5:
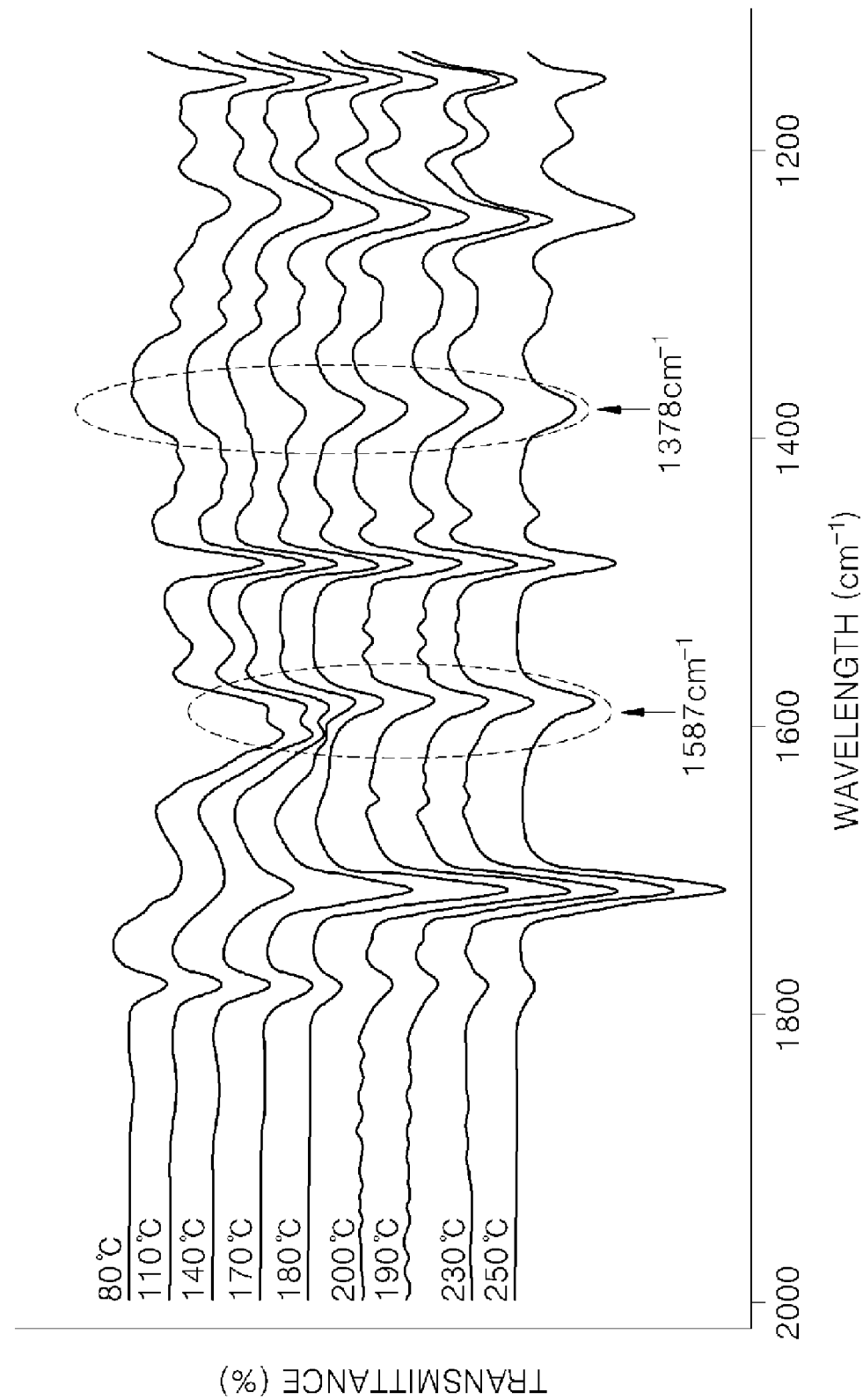
FIG. 5 shows a FT-IR spectrum illustrating that polyamic acid is converted into polyimide as temperature increases according to Synthesis Example 1-1.

Referring to FIG. 5, it can be seen that imidization of polyamic acid increased with an increase in the heat-treatment temperature to effect cross-linked polyimide was synthesized. As the imidization temperature was increased from 80 to 250° C., the band at 1378 cm$^{-1}$, corresponding to the C—N—C stretching of the imide ring increased, and the band corresponding to the C—N/N—H coupled deformation of amide changed from bimodal to a single peak at a wavelength of 1587 cm$^{-1}$, indicating imide formation from amide.

Coefficient of thermal expansion (CTE), indicating dimensional stability of the polyimides, was also determined. Polyimide films were prepared using the cross-linked metal-containing polyimide according to Synthesis Examples 1-1 and 1-2, polyimide according to Comparative Synthesis Example 1, and cross-linked polyimide according to Comparative Synthesis Example 2. Coefficient of thermal expansion (CTE), indicative of thermal properties of the polyimide films, was measured for each film over a temperature range of 50 to 150° C. The results for CTE determinations are shown in Table 3 below.

TABLE 3

| | CTE (ppm/° C.) |
|---|---|
| Synthesis Example 1-1 | 22.65 |
| Synthesis Example 1-2 | 42.40 |
| Synthesis Example 1-3 | 48.50 |
| Comparative Synthesis Example 1 | 68.01 |
| Comparative Synthesis Example 2 | 37.87 |

Referring to Table 3, it can be seen that for the more highly crosslinked polyimide film (Synthesis Example 1-1), the CTE was lowest at about 23 ppm/° C. (compare to non-crosslinked Comparative Synthesis Example 1 at about 68 ppm/° C.). In addition, increasing catalyst content (lowest in Synthesis Example 1-3, highest in Synthesis Example 1-1) showed a clear trend to decreasing CTE. Though Comparative Synthesis Example 2 showed lower CTE than Synthesis Examples 1-2 and 1-3, the YI and transparency were poor. Hence, it can be seen that performing imidization after cross-linking using a catalyst is more efficient even though the CTE decreases by thermal cross-linking. Accordingly, the degree of cross-linking may increase as the amount of the catalyst increases by the catalyst. With higher crosslinking, low thermal expansion properties may thus be obtained.

It should be understood that the exemplary embodiments described therein should be considered as illustrative only and not for purposes of limitation. Descriptions of features or aspects within each embodiment should typically be considered as available for other similar features or aspects in other embodiments.

What is claimed is:

1. A cross-linked metal-containing polyamic acid comprising:
   a metal; and
   a cross-linked polyamic acid which is a condensation product of an acid anhydride represented by Formula 1 and a diamine compound:

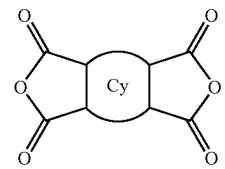

Formula 1 wherein the

group comprises a cross-linkable functional group and the

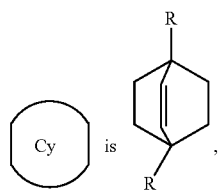

wherein each R independently is selected from the group consisting of a hydrogen atom, a C1-C10 alkyl group, a C1-C10 alkyloxy group, a C6-C10 aryl group, a halogen atom, and any combination thereof.

2. The cross-linked metal-containing polyamic acid of claim 1, wherein the diamine compound is represented by Formula 4 below:

H$_2$N-A-NH$_2$     Formula 4 wherein A comprises one selected from the group consisting of

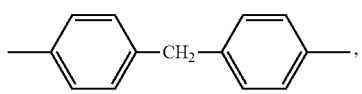

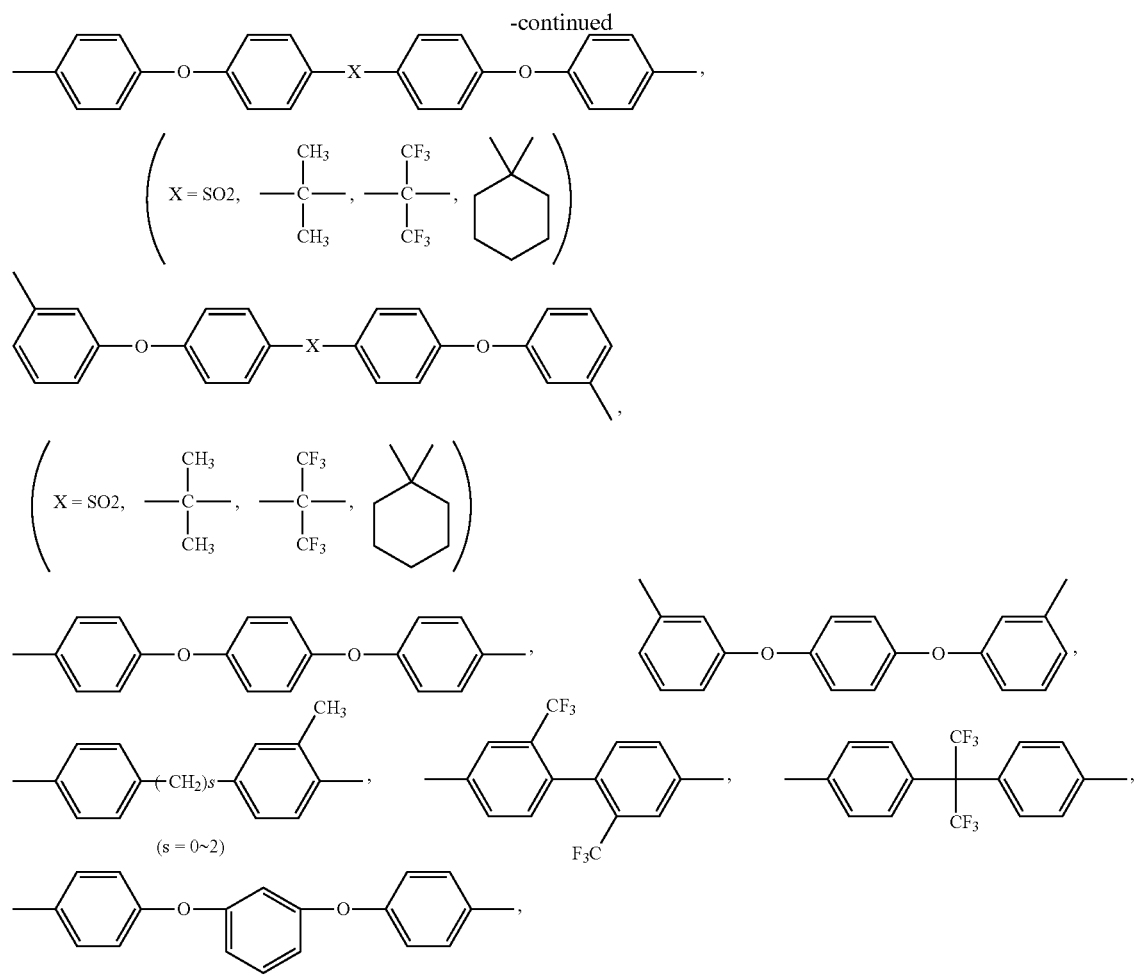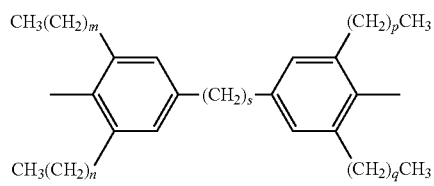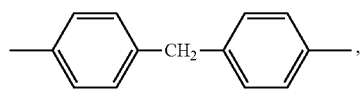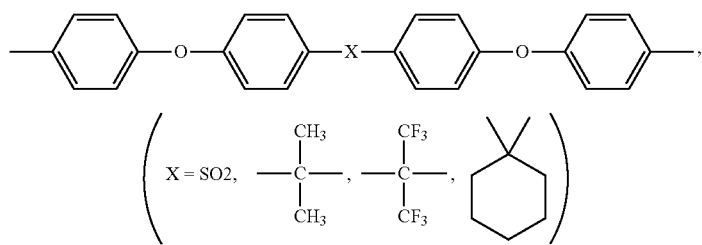

wherein m, n, p, and q are each independently an integer of 0 to 18, and s is an integer of 0 to 2,

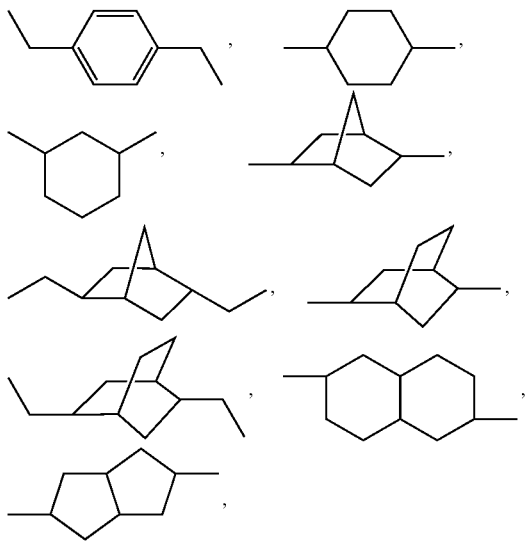

and any combination thereof.

3. The cross-linked metal-containing polyamic acid of claim 1, wherein the metal is selected from the group consisting of ruthenium (Ru), tungsten (W), molybdenum (Mo), osmium (Os), titanium (Ti), nickel (Ni), tantalum (Ta), zirconium (Zr), platinum (Pt), palladium (Pd), gold (Au), and any combination thereof.

4. The cross-linked metal-containing polyamic acid of claim 1, wherein the amount of the metal is from about 0.0001 to about 2.5 wt % based on the total weight of the cross-linked metal-containing polyamic acid.

5. The cross-linked metal-containing polyamic acid of claim 1, further comprising an additional dianhydride of Formula 3 without a crosslinkable functional group:

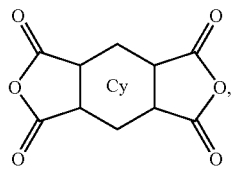

Formula 3 where

is a trivalent or a quadrivalent organic group selected from the group consisting of a substituted or unsubstituted C4-C20 carbon cyclic group, a substituted or unsubstituted C6-C20 monocyclic aromatic group, and a substituted or unsubstituted C2-C20 condensed polycyclic aromatic group, an interconnected C2-C20 non-condensed polycyclic aromatic group interconnected by a substituted or unsubstituted aromatic group, and any combination thereof.

6. A cross-linked metal-containing polyimide comprising:
a metal; and
a cross-linked polyimide which is a condensation product of an acid anhydride represented by Formula 1 and a diamine compound and imidization of the condensation product:

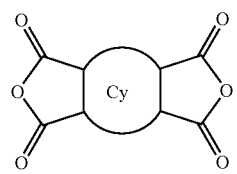

Formula 1 wherein the

comprises a cross-linkable functional group and the

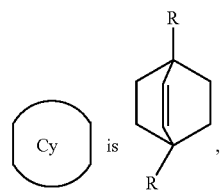

wherein each R independently is selected from the group consisting of a hydrogen atom, a C1-C10 alkyl group, a C1-C10 alkyloxy group, a C6-C10 aryl group, a halogen atom, and any combination thereof.

7. The cross-linked metal-containing polyimide of claim 6, wherein the diamine compound is represented by Formula 4 below:

$H_2N-A-NH_2$  Formula 4 wherein A comprises one selected from the group consisting of

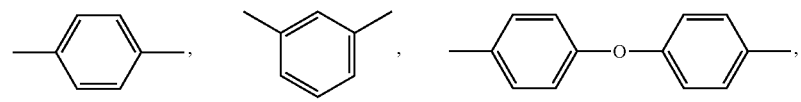

-continued

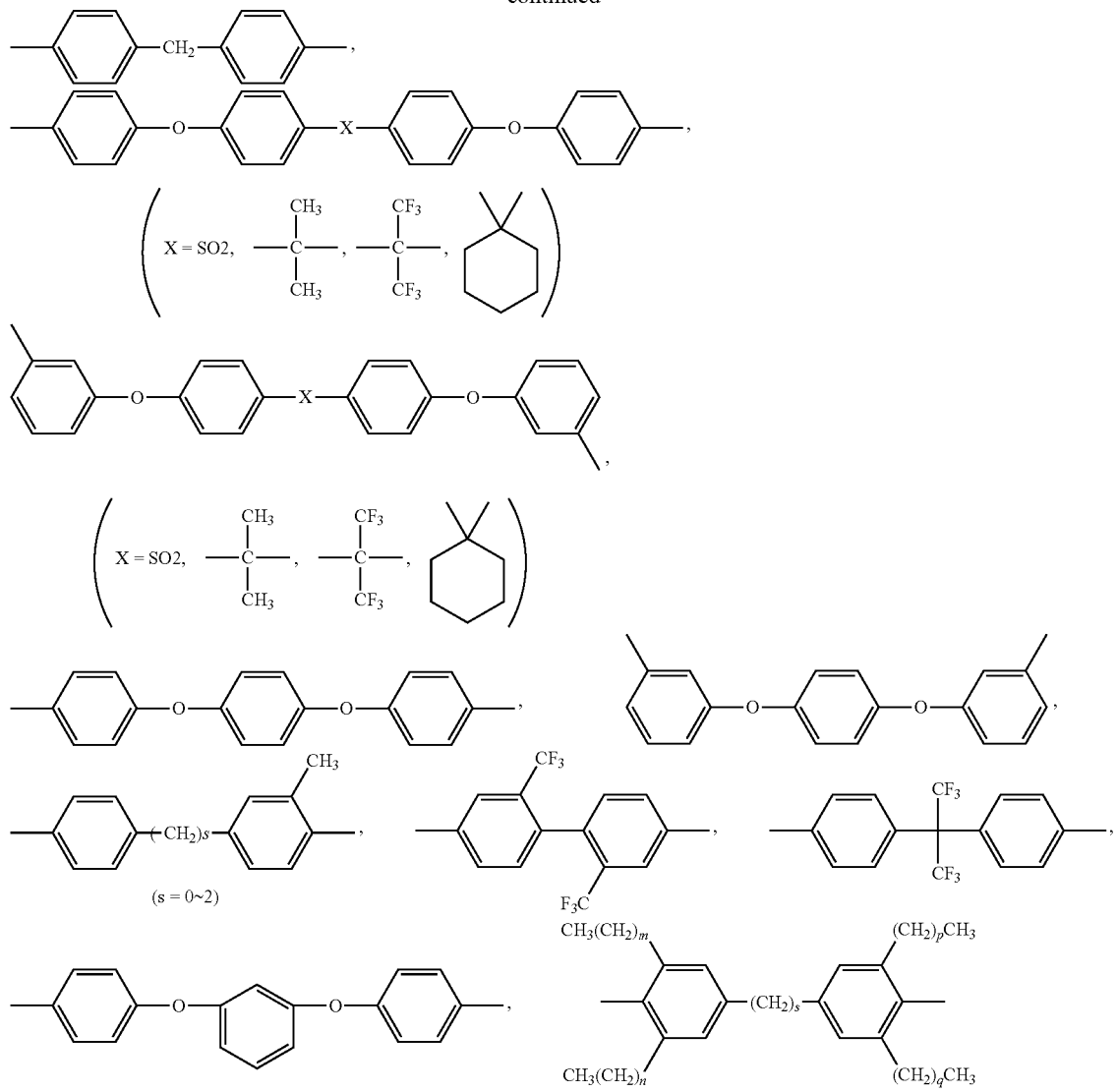

wherein m, n, p, and q are each independently an integer of 0 to 18, and s is an integer of 0 to 2,

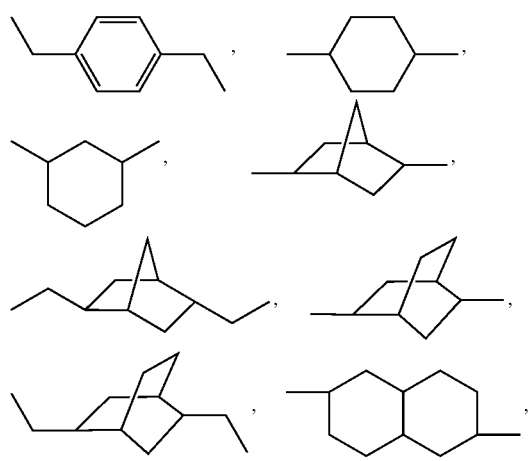

-continued

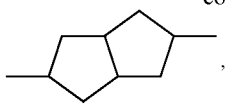

and any combination thereof.

8. The cross-linked metal-containing polyimide of claim 6, wherein the metal is selected from the group consisting of ruthenium (Ru), tungsten (W), molybdenum (Mo), osmium (Os), titanium (Ti), nickel (Ni), tantalum (Ta), zirconium (Zr), platinum (Pt), palladium (Pd), gold (Au), and any combination thereof.

9. The cross-linked metal-containing polyimide of claim 6, wherein the amount of the metal is from about 0.0001 to about 2.5 wt % based on the total weight of the cross-linked metal-containing polyimide.

10. The cross-linked metal-containing polyimide of claim 6, further comprising an additional dianhydride of Formula 3 without a crosslinkable functional group:

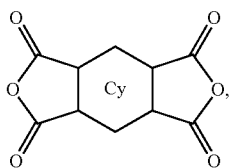

where

is a trivalent or a quadrivalent organic group selected from the group consisting of a substituted or unsubstituted C4-C20 carbon cyclic group, a substituted or unsubstituted C6-C20 monocyclic aromatic group, and a substituted or unsubstituted C2-C20 condensed polycyclic aromatic group, an interconnected C2-C20 non-condensed polycyclic aromatic group interconnected by a substituted or unsubstituted aromatic group, and any combination thereof.

11. A polyimide film comprising a cross-linked metal-containing polyimide comprising:
   a metal; and
   a cross-linked polyimide which is a condensation product of an acid anhydride represented by Formula 1 and a diamine compound, and imidization of the condensation product;

Formula 1

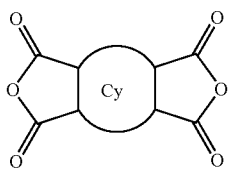

wherein the

Formula 3

comprises a cross-linkable functional group and the

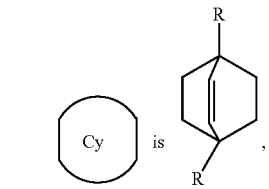

wherein each R independently is selected from the group consisting of a hydrogen atom, a C1-C10 alkyl group, a C1-C10 alkyloxy group, a C6-C10 aryl group, a halogen atom, and any combination thereof.

12. The polyimide film of claim 11, wherein the aromatic diamine compound is represented by Formula 4 below:

$$H_2N\text{-}A\text{-}NH_2 \qquad \text{Formula 4}$$

wherein A comprises one selected from the group consisting of

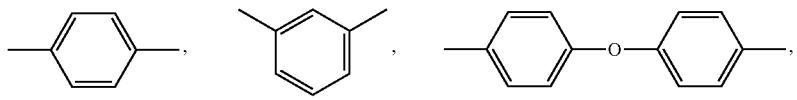

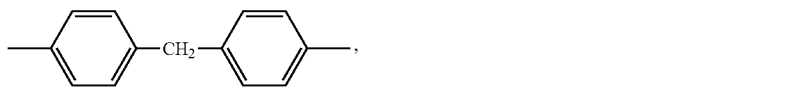

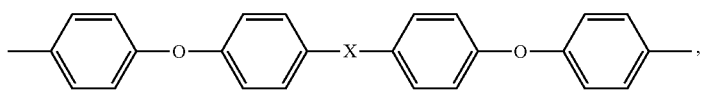

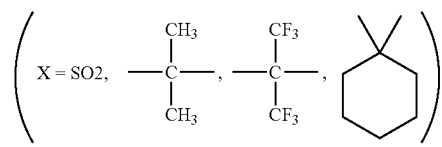

-continued

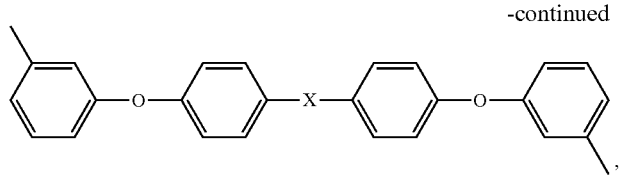

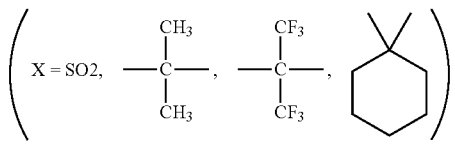

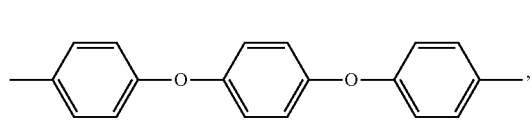

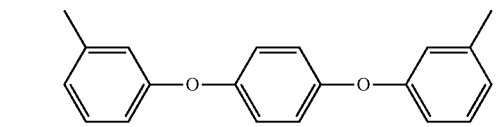

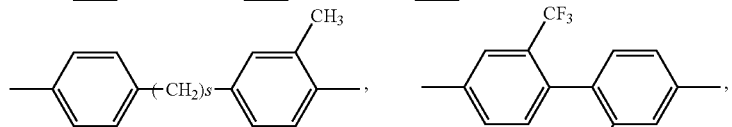

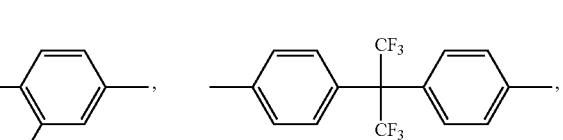

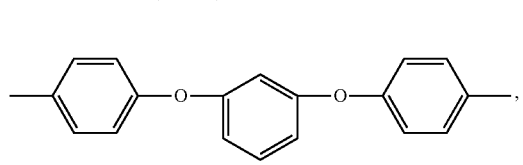

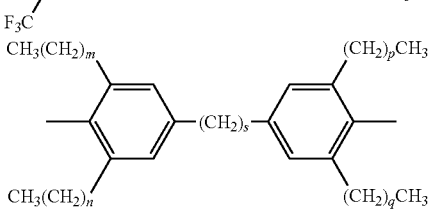

wherein m, n, p, and q are each independently an integer of 0 to 18, and s is an integer of 0 to 2,

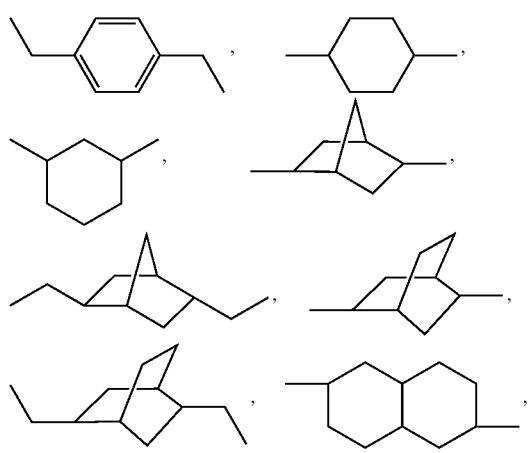

-continued

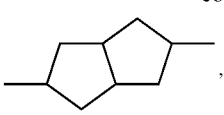

and any combination thereof.

13. The polyimide film of claim 11, wherein the metal is selected from the group consisting of ruthenium (Ru), tungsten (W), molybdenum (Mo), osmium (Os), titanium (Ti), nickel (Ni), tantalum (Ta), zirconium (Zr), platinum (Pt), palladium (Pd), gold (Au), and any combination thereof.

14. The polyimide film of claim 11, wherein the amount of the metal is from about 0.0001 to about 2.5 wt % based on the total weight of the cross-linked metal-containing polyimide.

* * * * *